United States Patent
Zurek et al.

(10) Patent No.: US 10,665,234 B2
(45) Date of Patent: May 26, 2020

(54) DETECTING AUDIO TRIGGER PHRASES FOR A VOICE RECOGNITION SESSION

(71) Applicant: MOTOROLA MOBILITY LLC, Chicago, IL (US)

(72) Inventors: Robert A. Zurek, Antioch, IL (US); Pratik M. Kamdar, Naperville, IL (US); Jincheng Wu, Naperville, IL (US); Joel Clark, Woodridge, IL (US); Plamen Ivanov, Schaumburg, IL (US)

(73) Assignee: Motorola Mobility LLC, Chicago, IL (US)

( * ) Notice: Subject to any disclaimer, the term of this patent is extended or adjusted under 35 U.S.C. 154(b) by 69 days.

(21) Appl. No.: 15/883,368

(22) Filed: Jan. 30, 2018

(65) Prior Publication Data

US 2019/0115018 A1   Apr. 18, 2019

Related U.S. Application Data

(60) Provisional application No. 62/574,144, filed on Oct. 18, 2017.

(51) Int. Cl.
| | |
|---|---|
| *G10L 15/22* | (2006.01) |
| *G06F 3/16* | (2006.01) |
| *G10L 17/22* | (2013.01) |
| *H04R 1/40* | (2006.01) |
| *H04R 3/00* | (2006.01) |

(52) U.S. Cl.
CPC ............. *G10L 15/22* (2013.01); *G06F 3/165* (2013.01); *G10L 17/22* (2013.01); *H04R 1/406* (2013.01); *H04R 3/005* (2013.01); *G10L 2015/223* (2013.01); *H04R 2201/401* (2013.01); *H04R 2420/09* (2013.01); *H04R 2430/20* (2013.01); *H04R 2499/11* (2013.01)

(58) Field of Classification Search
CPC ...................................................... G10L 17/00
USPC ........................................................... 704/246
See application file for complete search history.

(56) References Cited

U.S. PATENT DOCUMENTS

| 6,185,535 B1 * | 2/2001 | Hedin ..................... G10L 15/30 |
| | | 704/270 |
| 8,724,829 B2 * | 5/2014 | Visser ................. G10L 21/0216 |
| | | 381/97 |
| 9,747,926 B2 * | 8/2017 | Sharifi .................... G10L 17/08 |

(Continued)

*Primary Examiner* — Huyen X Vo
*Assistant Examiner* — Timothy Nguyen
(74) *Attorney, Agent, or Firm* — Yudell Isidore PLLC

(57) ABSTRACT

A method, a system, and a computer program product for detecting an audio trigger phrase at a particular audio input channel and initiating a voice recognition session. The method includes capturing audio content by a plurality of microphone pairs of an audio capturing device, wherein each microphone pair of the plurality of microphone pairs is associated with an audio input channel of a plurality of audio input channels of the audio capturing device. The method further includes simultaneously monitoring, by a processor of the audio capturing device, audio content on each of the audio input channels. The method further includes: independently detecting, by the processor, an audio trigger phrase on at least one audio input channel of the plurality of audio input channels; and in response to detecting the audio trigger phrase, commencing a voice recognition session using the at least one audio input channel as an audio source.

19 Claims, 11 Drawing Sheets

(56) References Cited

U.S. PATENT DOCUMENTS

| | | | | |
|---|---|---|---|---|
| 10,013,981 | B2* | 7/2018 | Ramprashad | G10L 15/32 |
| 10,149,049 | B2* | 12/2018 | Moghimi | H04R 3/005 |
| 10,181,323 | B2* | 1/2019 | Beckhardt | G10L 15/32 |
| 10,192,557 | B2* | 1/2019 | Lee | G10L 15/32 |
| 10,204,623 | B2* | 2/2019 | Segal | G10L 25/78 |
| 2004/0131201 | A1* | 7/2004 | Hundal | H04M 9/082 |
| | | | | 381/77 |
| 2006/0111904 | A1* | 5/2006 | Wasserblat | G10L 17/00 |
| | | | | 704/246 |
| 2009/0055180 | A1* | 2/2009 | Coon | B60R 16/0373 |
| | | | | 704/251 |
| 2009/0086949 | A1* | 4/2009 | Caspi | H04M 3/385 |
| | | | | 379/202.01 |
| 2011/0038489 | A1* | 2/2011 | Visser | G01S 3/8006 |
| | | | | 381/92 |
| 2012/0044786 | A1* | 2/2012 | Booij | G01S 5/18 |
| | | | | 367/127 |
| 2012/0197629 | A1* | 8/2012 | Nakamura | G06F 17/289 |
| | | | | 704/3 |
| 2012/0284023 | A1* | 11/2012 | Vitte | H04M 9/082 |
| | | | | 704/233 |
| 2013/0058492 | A1* | 3/2013 | Silzle | H04R 5/027 |
| | | | | 381/59 |
| 2013/0282373 | A1* | 10/2013 | Visser | G10L 21/0208 |
| | | | | 704/233 |
| 2013/0317830 | A1* | 11/2013 | Visser | G10L 19/00 |
| | | | | 704/500 |
| 2013/0325484 | A1* | 12/2013 | Chakladar | G06F 3/167 |
| | | | | 704/275 |
| 2013/0332157 | A1* | 12/2013 | Iyengar | G10L 15/20 |
| | | | | 704/233 |
| 2014/0142935 | A1* | 5/2014 | Lindahl | G10L 21/0208 |
| | | | | 704/226 |
| 2014/0278416 | A1* | 9/2014 | Schuster | G10L 17/00 |
| | | | | 704/246 |
| 2014/0278418 | A1* | 9/2014 | Chen | G10L 17/00 |
| | | | | 704/246 |
| 2014/0343935 | A1* | 11/2014 | Jung | G10L 15/20 |
| | | | | 704/233 |
| 2014/0379332 | A1* | 12/2014 | Rodriguez | G10L 17/00 |
| | | | | 704/219 |
| 2015/0006184 | A1* | 1/2015 | Marti | G10L 15/22 |
| | | | | 704/275 |
| 2015/0086021 | A1* | 3/2015 | Hardacker | H03G 3/301 |
| | | | | 381/1 |
| 2015/0106085 | A1* | 4/2015 | Lindahl | G10L 15/32 |
| | | | | 704/231 |
| 2015/0106088 | A1* | 4/2015 | Jarvinen | G10L 21/0208 |
| | | | | 704/233 |
| 2015/0235637 | A1* | 8/2015 | Casado | G10L 17/06 |
| | | | | 704/235 |
| 2016/0019026 | A1* | 1/2016 | Gupta | G06F 3/167 |
| | | | | 704/233 |
| 2016/0064000 | A1* | 3/2016 | Mizumoto | G06T 7/73 |
| | | | | 704/233 |
| 2016/0086609 | A1* | 3/2016 | Yue | G10L 17/02 |
| | | | | 704/239 |
| 2016/0127815 | A1* | 5/2016 | Ookuri | H04R 1/06 |
| | | | | 381/119 |
| 2016/0180852 | A1* | 6/2016 | Huang | G10L 17/005 |
| | | | | 704/246 |
| 2016/0217795 | A1* | 7/2016 | Lee | G10L 15/32 |
| 2016/0306024 | A1* | 10/2016 | Buck, Jr. | G01S 3/80 |
| 2016/0379626 | A1* | 12/2016 | Deisher | G10L 15/30 |
| | | | | 704/232 |
| 2017/0011753 | A1* | 1/2017 | Herbig | H04R 3/00 |
| 2017/0099550 | A1* | 4/2017 | Blessing | H04R 25/50 |
| 2017/0330564 | A1* | 11/2017 | Daley | G10L 15/08 |
| 2018/0227665 | A1* | 8/2018 | Elko | H04R 1/406 |

\* cited by examiner

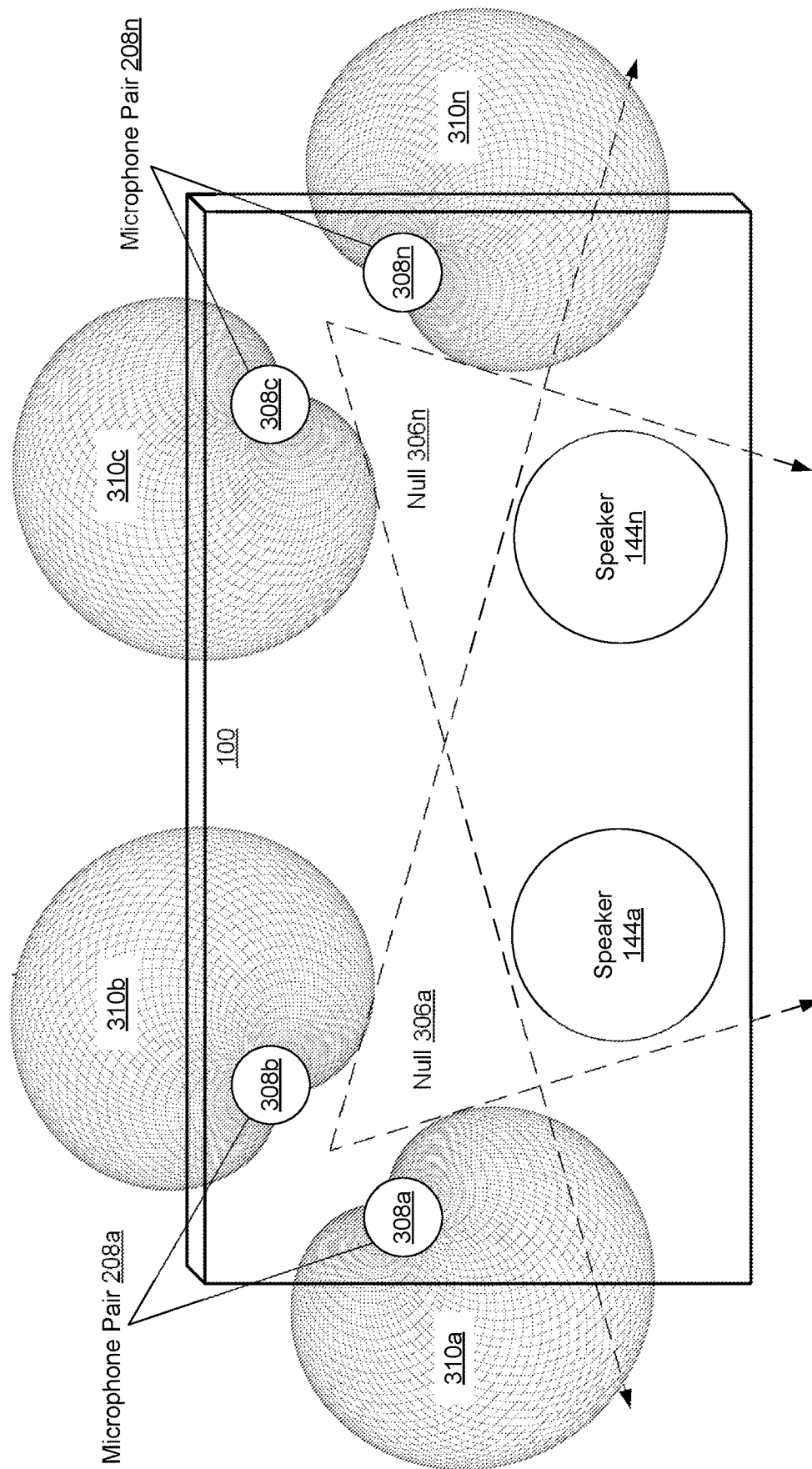

US 10,665,234 B2

DETECTING AUDIO TRIGGER PHRASES FOR A VOICE RECOGNITION SESSION

PRIORITY APPLICATION

This application claims benefit of priority to U.S. Provisional Patent Application No. 62/574,144, filed Oct. 18, 2017, the content of which incorporated by reference.

BACKGROUND

1. Technical Field

The present disclosure generally relates to devices having microphones and in particular to a method for detecting audio trigger phrases to initiate a voice recognition session.

2. Description of the Related Art

Many modern devices are equipped with personal assistant utilities that enable users to access data and retrieve information using voice commands. However, when multiple users are present in a room it may be difficult for a device to accurately recognize a specific user that has spoken a trigger command and/or initiated a request while other persons are talking. Additionally, many devices must first disable audio playback on the portable device before queries may be received from a user within a voice recognition session.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3B illustrates a plurality of gradient fields captured by microphones of an audio capturing device, in accordance with one or more embodiments;

DETAILED DESCRIPTION

Figure 1:
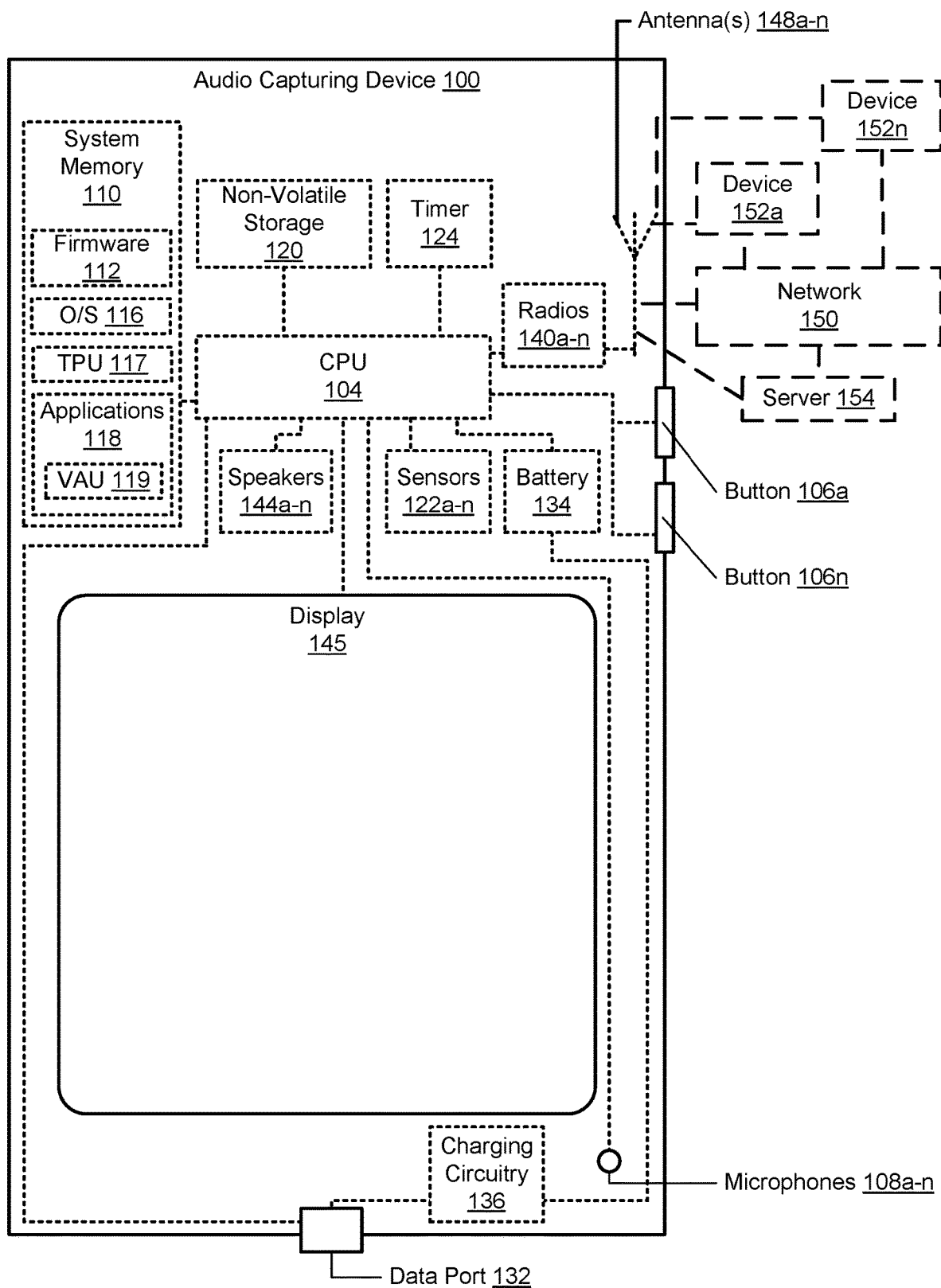
FIG. 1 illustrates an example audio capturing device within which certain aspects of the disclosure can be practiced, in accordance with one or more embodiments.

The illustrative embodiments provide a method, a system, and a computer program product for detecting an audio trigger phrase at a particular audio input channel from among a plurality of audio input channels and initiating a voice recognition session at that audio input channel. The method includes capturing audio content via a plurality of microphone pairs of an audio capturing device. Each microphone pair of the plurality of microphone pairs is associated with an audio input channel from among a plurality of audio input channels of the audio capturing device. The method further includes simultaneously monitoring, by a processor of the audio capturing device, audio content on each of the plurality of audio input channels. The method further includes: independently detecting, by the processor, an audio trigger phrase on at least one audio input channel of the plurality of audio input channels; and in response to detecting the audio trigger phrase, initiating a voice recognition session using the at least one audio input channel as an audio source.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the below described audio capturing device 100 (FIG. 1) are not intended to be exhaustive, but rather are representative to highlight components that can be utilized to implement the present disclosure. Other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example audio capturing device 100 within which one or more of the described features of the various embodiments of the disclosure can be implemented. In one embodiment, audio capturing device 100 can be any electronic device that is equipped with and/or connected to at least one speaker and at least one microphone. For example, audio capturing device 100 can include, but is not limited to, a desktop computer, a monitor, a notebook computer, a mobile phone, a mobile phone accessory, a virtual reality headset, a digital camera, a video recorder, or a tablet computer. Audio capturing device 100 includes at least one processor or central processing unit (CPU) 104. In another embodiment, CPU 104 may include a graphical processing unit (GPU), general purpose graphical processing unit (GPGPU), or digital signal processor (DSP). CPU 104 may contain a plurality of cores, each of which is capable of independent processing. CPU 104 is coupled to non-volatile storage 120 and system memory 110, within which firmware 112, operating system (OS) 116, trigger phrase utility (TPU) 117, and applications 118 can be stored for execution by CPU 104.

As shown, audio capturing device 100 may include input devices and output devices that enable a user to interface with audio capturing device 100. In the illustrated embodiment, audio capturing device 100 includes microphones 108a-n, hardware buttons 106a-n, and speakers 144a-n. Audio capturing device 100 may optionally include display 145. Microphone 108a-n may be used to receive spoken input/commands from a user. In one or more embodiments, microphones 108a-n are omnidirectional microphones. In another embodiment, microphones 108a-n include at least one unidirectional microphone. In one embodiment, microphones 108a-n include at least one internal microphone of audio capturing device 100. In another embodiment, microphones 108a-n include at least one external microphone, such as a wireless microphone, that is connected to audio capturing device 100 via a wired and/or wireless network connection. Hardware buttons 106a-n are selectable buttons which are used to receive manual/tactile input from a user to control specific operations of audio capturing device 100 and/or of applications executing thereon. In one embodiment, hardware buttons 106a-n may also include, or may be connected to, one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of audio capturing device 100. In one embodiment, hardware buttons 106a-n may include a keyboard. Speakers 144a-n are used to output audio.

CPU 104 is also coupled to sensors 122a-n and display 145. Sensors 122a-n can include, but are not limited to including, at least one of: motion sensors and/or accelerometers, proximity sensors, and camera/image sensors. Display 145 is capable of displaying text, media content, including images and video, and/or a graphical user interface (GUI) associated with or generated by firmware and/or one or more applications executing on audio capturing device 100. In one embodiment, display 145 includes at least one internal display/monitor of audio capturing device 100. In another embodiment, display 145 includes at least one external display, such as a remotely connected monitor, that is connected to audio capturing device 100 via a wired and/or wireless connection. The GUI can be rendered by CPU 104 for viewing on display 145, in one embodiment, or can be rendered by a graphics processing unit (GPU) (not illustrated), in another embodiment. In one embodiment, display 145 is a touch screen that is also capable of receiving touch/tactile input from a user of audio capturing device 100, such as when the user is interfacing with a displayed (or partially displayed) GUI. In at least one embodiment, audio capturing device 100 can include a plurality of virtual buttons or affordances that operate in addition to, or in lieu of, hardware buttons 106a-n. For example, audio capturing device 100 can be equipped with a touch screen interface and provide, via a GUI, a virtual keyboard or other virtual icons for user interfacing therewith.

Applications 118 include virtual assistant utility (VAU) 119. VAU 119 receives requests for information and/or data from a user of audio capturing device 100 via at least one input device, such as microphones 108a-n. In response to receiving the request, VAU 119 retrieves the requested information locally and/or from a remote database and/or server and outputs the requested information/data on at least one output device (e.g., speakers 144a-n) of audio capturing device 100. For example, a user of audio capturing device 100 may voice/speak a request for the current forecast for the current location of the device/user. VAU 119 retrieves the requested forecast and presents the current forecast to the user as audio via speakers 144a-n and/or visually via display 145. In one or more embodiments, VAU 119 includes speech recognition utilities/algorithms and command generation utilities/algorithms. In one or more embodiments, applications 118 include one or more of: a search application, speech recognition applications, text-to-speech applications, speech-to-text applications, command generation applications, and/or voice recognition applications which invoke commands based on user speech input captured by at least one microphone from among microphones 108a-n. According to one aspect, TPU 117 and VAU 119 execute within audio capturing device 100 to perform the various methods and functions described herein. In one or more embodiments, TPU 117 analyzes user speech to perform functions at audio capturing device 100. For simplicity, TPU 117 is illustrated and described as a stand-alone or separate software/firmware/logic component, which provides the specific functions and methods described below. However, in at least one embodiment, TPU 117 may be a component of, may be combined with, or may be incorporated within firmware 112, or OS 116, and/or within one or more of applications 118. For example, TPU 117 may be an added utility provided as an extension of and/or within VAU 119.

Audio capturing device 100 also includes data port 132 (e.g., a universal serial bus (USB) port), battery 134, and charging circuitry 136. Data port 132 can operate as a charging port that receives power via an external charging device (not pictured) for charging battery 134 via charging circuitry 136. Data port 132 can operate as a charging port that provides power to an external device that is connected to data port 132 for charging a battery (not pictured) of the external device via charging circuitry 136. Battery 134 may include a single battery or multiple batteries for providing power to components of audio capturing device 100. In at least one embodiment, battery 134 may include at least one battery that is removable and/or replaceable by an end user. In another embodiment, battery 134 may include at least one battery that is permanently secured within/to audio capturing device 100. Data port 132 may also function as one of an input port, an output port, and a combination input/output port. In one or more embodiments, audio capturing device may include additional data ports that enable audio capturing device to interface with another device, such as a portable device via one or more connectors, as shown in greater detail in FIGS. 6 and 7.

Audio capturing device 100 may also include one or more wireless radios 140a-n and can include one or more antenna(s) 148a-n that enable audio capturing device 100 to wirelessly connect to, and transmit and receive voice and/or data communication to/from, one or more other devices, such as devices 152a-n and server 154. As a wireless device, audio capturing device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, audio capturing device 100 may be further equipped with infrared (IR) device (not pictured) for communicating with other devices using an IR connection. In another embodiment, wireless radios 140a-n may include a short-range wireless device, including, but not limited to, a near field communication (NFC) device. In still another embodiment, audio capturing device 100 may communicate with one or more other device(s) using a wired or wireless USB connection.

Figure 2:
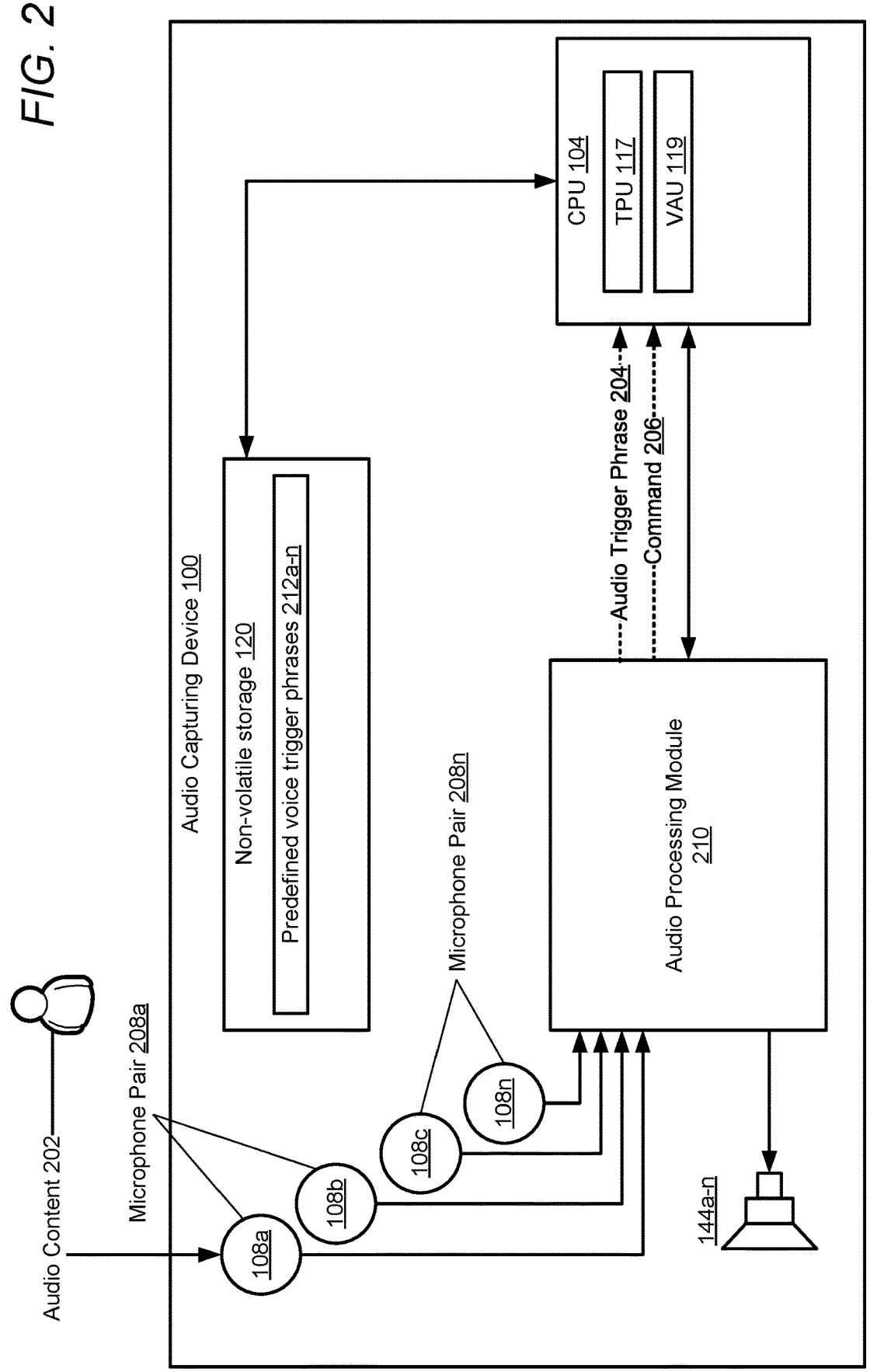
FIG. 2 illustrates an example audio capturing device that is configured to detect an audio trigger phrase at a particular audio input channel and initiate a voice recognition session at that audio input channel, in accordance with one or more embodiments.

FIG. 2 is a block diagram illustrating additional functional components within example audio capturing device 100, in accordance with one or more embodiments of the present disclosure. Audio capturing device 100 is configured to detect an audio trigger phrase at a particular audio input channel from among a plurality of input channels and to initiate a voice recognition session on that audio input channel. As illustrated, audio capturing device 100 includes CPU 104, which executes TPU 117. Audio capturing device 100 also includes non-volatile storage 120, microphones 108a-n, audio processing module 210, and speakers 144a-n. In one or more embodiments, microphones 108a-n are utilized by CPU 104 to capture an audibly received audio trigger phrase 204. It should be noted that while four microphones are illustrated in FIG. 2, in other embodiments, audio capturing device may be configured with additional or fewer microphones, including a single microphone. Speakers 144a-n are utilized by CPU 104 to play audio intended for a user. In one or more embodiments, speakers 144a-n may be used to verbally communicate requested information and/or data to one or more users of audio capturing device.

Audio capturing device 100 captures audio content 202 via microphones 108a-n and analyzes the audio content, via an audio processing module, for audio trigger phrase 204 that matches at least one of predefined voice trigger phrases 212a-n. Predefined voice trigger phrases 212a-n are predefined trigger commands, such as 'Okay Moto' or 'Alexa', that cause VAU 119 to actively listen for a subsequent statement/command/request/comment (generally "input") 206 within audio content 202. For example, in the phrase 'Okay Moto, what's the weather for today', 'Okay Moto' is the trigger phrase that causes activation of VAU 119 and 'what's the weather for today' is the input that is processed by VAU 119. VAU 119 can accept a variety of commands/requests for any number of applications. In one or more embodiments, VAU 119 can launch and/or interface with other applications, such as a music playback application. It should be noted that while predefined voice trigger phrases 212a-n are described herein as a spoken voice trigger, in other embodiments predefined voice trigger phrases 212a-n can include any audibly detected trigger.

In one or more embodiments, microphones 108a-n include a plurality of microphone subsets. In one embodiment, each microphone set may include a pair of microphones (e.g., microphone pairs 208a-n), as illustrated further within FIGS. 3A-B and FIGS. 4-7. In another embodiment, each microphone subset may include a different number of microphones, such as three microphones or four microphones. Each individual microphone can be a member of one or more pairs of microphones. In an embodiment where audio capturing device 100 includes microphone pairs (e.g., microphone pairs 208a-n), each of microphone pairs 208a-n is associated with an audio input channel of a plurality of audio input channels of audio capturing device 100. In one or more embodiments, each of microphone pairs 208a-n is arranged within audio capturing device 100 such that the microphone pair can be processed to form virtual first order directional microphones. A first virtual microphone captures audio in a first direction and a second virtual microphone using the same microphone pair (microphone pair 208a) captures audio in a second direction that is opposite the first direction. The spacing between each microphone 108a-n in a microphone pair 208a-n is such that a directional location of a sound source within an audio field captured by the formed virtual microphone may be achieved. In one or more embodiments, the centers of microphone pairs 208a-n are not collocated. In one embodiment, the first microphone (e.g., microphone 108a) and the second microphone (e.g., microphone 108b) of each microphone pair 208a-n are separated by a distance corresponding to a half wave length or less of a captured signal. In one or more embodiments, each microphone pair 208 is spaced sufficiently far apart to prevent a rotation of a beamform in a plane containing all of microphones 108a-n.

Figure 3A:
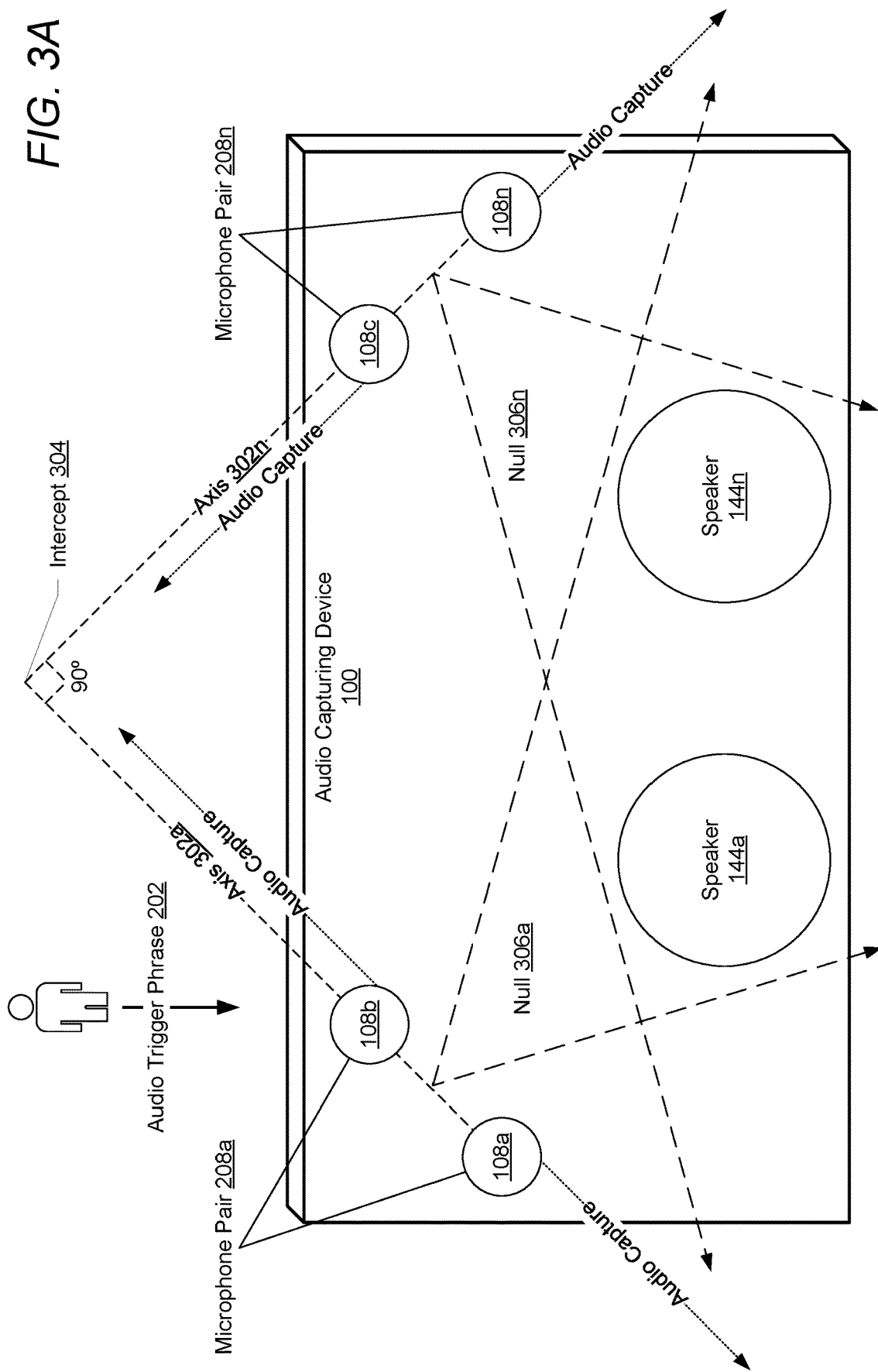
FIG. 3A illustrates an arrangement of microphones of an audio capturing device, in accordance with one or more embodiments.

In one or more embodiments, CPU 104 collectively processes, via a beamforming stage (e.g., beamforming stages 406a-n of FIG. 4), audio content captured by a first microphone and a second microphone of each microphone pair of the plurality of microphone pairs to create a plurality of virtual microphones, as described in greater detail in FIG. 4 below. The generated virtual microphones of each microphone pair include (i) a first virtual microphone that is aligned along an axis and which provides spatial sensitivity for audio originating within a first gradient field in a first direction and (ii) a second virtual microphone that is aligned along the same axis and which provides spatial sensitivity for audio originating within a second gradient field in a second direction that is opposite the first direction. It should be noted that at least one speaker (e.g., speakers 144) of audio capturing device 100 is located within a null direction of the plurality of virtual microphones (as shown in FIGS. 3A-B and described in greater detail below). The null direction may be a direction of absolute mathematical null, or a region of significant attenuation.

Referring now to FIG. 3A, there is illustrated an arrangement of microphones 108a-n, in accordance with one or more embodiments. As illustrated, microphones 108a-n are configured in two orthogonal microphone pairs: microphone pair 208a and microphone pair 208n. When first microphone pair 208a is beamform processed, a first virtual microphone and a second virtual microphone are created. The first virtual microphone captures audio in a first direction and the second virtual microphone captures audio in a second direction that is opposite the first direction. When the second microphone pair 208n is beamform processed, a third virtual microphone and a fourth virtual microphone are created. The third virtual microphone captures audio in a first direction and the fourth virtual microphone captures audio in a second direction that is opposite the first direction. Additionally, microphones 108a-n are positioned such that speakers 144a-n lie near the null of each virtual dipole microphone formed from each microphone pair, and the axes (e.g., axis 302a and axis 302n) of each microphone pair point away from at least one speaker of audio capturing device 100. For example, the axes of each microphone pair may point away from a driver/woofer and/or sound-radiating orifice of speakers 144a-n. As illustrated, speakers 144a-n are located within null region 306a of first microphone pair 208a and null 306n of second microphone pair 208n. In one or more embodiments, speakers 144a-n do not reside at a geometric center of any of the microphone pairs 208a-n. First axis (axis 302a) passes through a center of the first microphone (microphone 108a) and a center of the second microphone (microphone 108b) of the first microphone pair (e.g., microphone pair 208a). Second axis (axis 302n) passes through a center of the first microphone (microphone 108c) and a center of the second microphone (microphone 108n) of the second microphone pair (microphone pair 208n). Axis 302a and axis 302n meet at an orthogonal intercept, intercept 304, outside of audio capture device 100. In one or more embodiments, intercept 304 is further from the center of each microphone pair than a distance between the microphones in each microphone pair.

Referring again to FIG. 2, CPU 104 processes audio content 202 captured by microphones 108a-n by audio processing module 210 (as described in greater detail in the description of FIG. 4 below) to isolate individual users around audio capturing device 100 and determine which user(s) are issuing an audio trigger phrase 202. Audio content 202 is captured by each microphone 108a-n of each microphone pair 208a-n. At a beamforming stage (e.g., beamforming 406a-n of FIG. 4) of audio processing module 210, audio capturing device 100 collectively processes audio content 202, as described in greater detail below. The collective processing of content 202 captured by each microphone 108a-n of each microphone pair 208a-n creates a pair of virtual microphones (e.g., virtual microphones 308a-n of FIG. 3B) for each microphone pair 208a-n that capture audio within a corresponding gradient field (e.g., gradient fields 310a-n) in a particular direction. It should be noted that while gradient fields 310a-n are illustrated as cardioid fields in FIG. 3B, in other embodiments gradient fields may take the shape of other gradient patterns, such as a limacon, based on a beamforming algorithm applied at beamforming processing stage (e.g., beamforming 406a-n of FIG. 4) of audio processing module 210.

Referring now to FIG. 3B, there is illustrated gradient fields 310a-n captured by virtual microphones 308a-n, in accordance with one or more embodiments. Virtual microphones 308a-b and virtual microphones 308c-n are processed such that speakers 144a-n lie near the null of the virtual dipole microphone formed by each virtual microphone pair (virtual microphones 308a-n and virtual microphones 308c-n). Additionally, each virtual microphone pair (e.g., microphones 308a-b) is positioned at a point of significant attenuation to an opposing virtual microphone pair (e.g., virtual microphones 308c-n). Thus, each virtual microphone pair captures a pair of complimentary/opposing gradient fields. The resulting gradient fields 310a-n having angles that are equally spaced with respect to each other. In the illustrated embodiment virtual microphones 308a-n do not directly face speakers 144a-n, thus reducing any echo captured by audio capturing device 100.

Figure 3C:
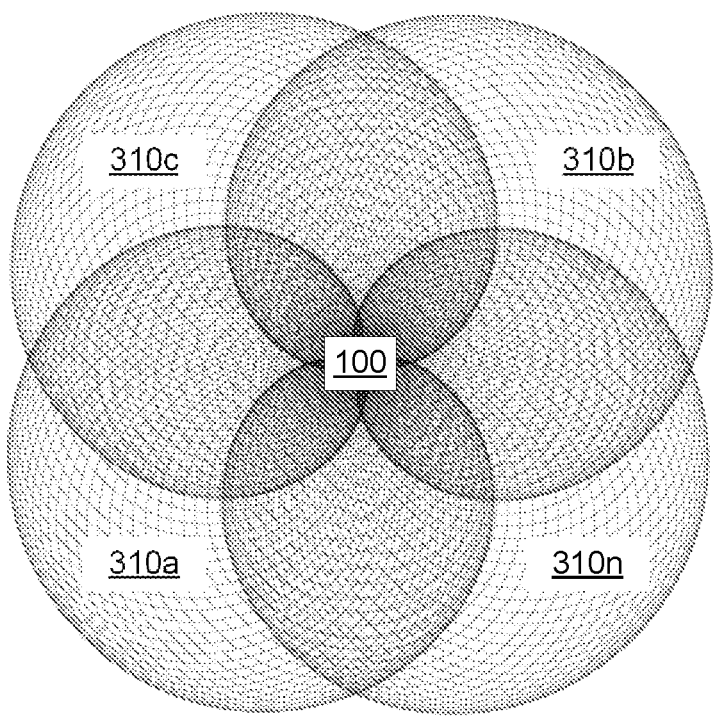
FIG. 3C illustrates a spatial sensitivity diagram of an audio capturing device, in accordance with one or more embodiments.

Referring now to FIG. 3C there is illustrated a spatial sensitivity 320 diagram associated with gradient fields 310a-n, in accordance with one or more embodiments. The combined gradient fields 310a-n, as illustrated in FIG. 3B, provide a 360-degree spatial sensitivity to audio within an environment of audio capturing device 100. It should also be noted that the illustrated gradient fields of FIG. 3B-C are not drawn to scale. In one or more embodiments, the illustrated gradient fields are much larger than as illustrated within FIG. 3B-C.

Identifying an Audio Source for a Voice Recognition Session

Figure 4:
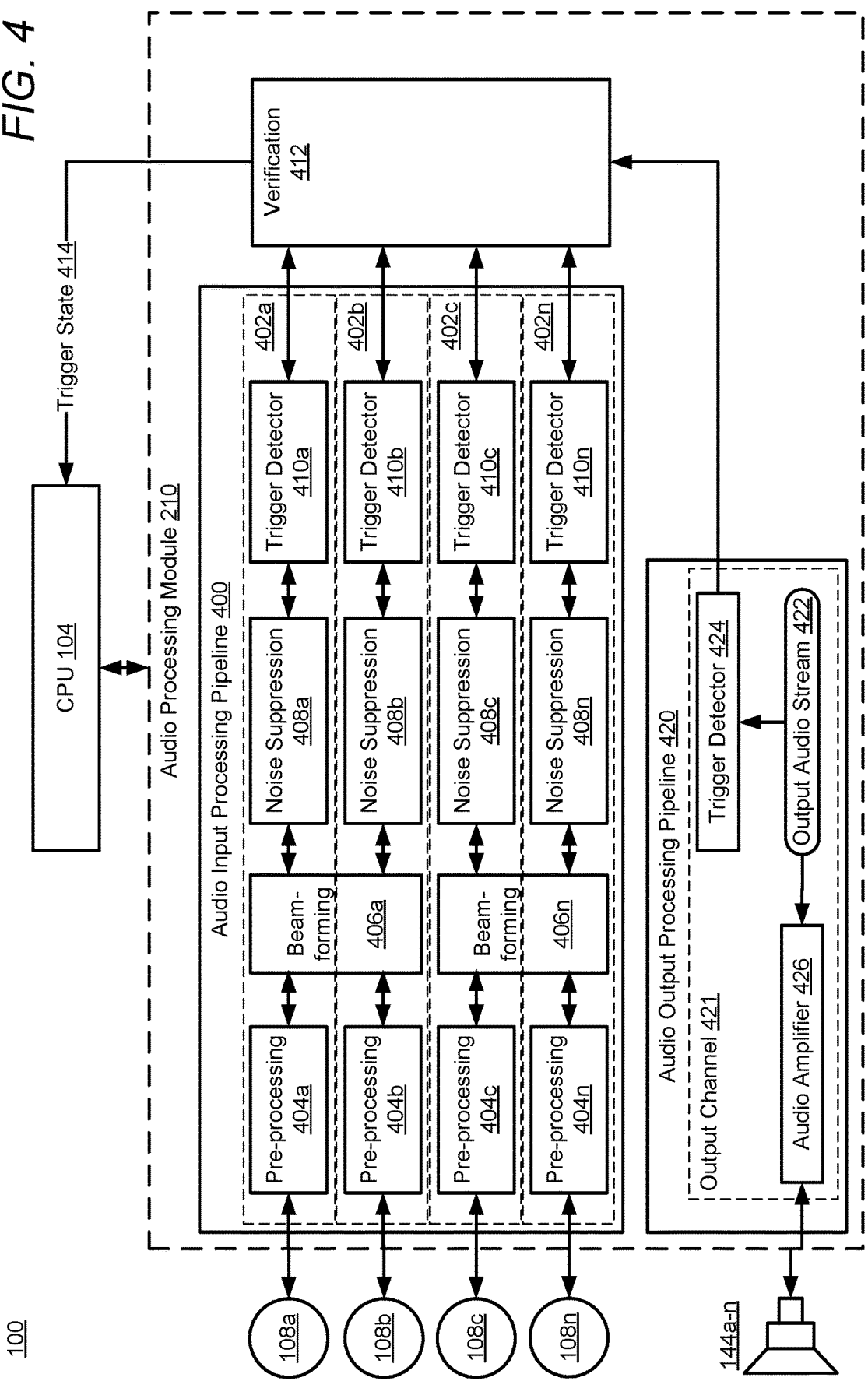
FIG. 4 illustrates an example audio processing module of an audio capturing device, in accordance with one or more embodiments.

Referring now to FIG. 4, there is illustrated audio processing module of an audio capturing device, in accordance with one or more embodiments of the disclosure.

Audio processing module 210 includes audio input processing pipeline 400, audio output processing pipeline 420, and verification module 412. Audio input processing pipeline 400 comprises a plurality of audio input channels 402a-n that perform an analog to digital conversion of a captured audio content (e.g., audio content 202). Each channel is connected to one or more of microphones 108a-n and contains a pre-processing stage 404a-n, beamforming stage 406a-n, noise suppression stage 408a-n, and trigger detector 410a-n. Pre-processing stages 404a-n performs at least one of: digital signal processing, filtering, amplification, automated gain control, compression, expansion, and echo control on an audio input of a corresponding microphone 108a-n. In embodiments that include echo control, an echo reference signal must be used in a digital signal processor (DSP) of audio processing module 210. The echo reference signal is typically derived from the electronic playback signal going to the output audio amplifier (e.g., audio amplifier 426) or speaker (e.g., speakers 144a-n). The echo reference can include one or more channels.

A pre-processed output signal of pre-processing stages 404a-n is provided to a corresponding beamforming stage 406a-n. Each beamforming stage performs beamform processing using two channels, each of which corresponds to a microphone of a corresponding microphone pair (e.g., microphone pair 208a). The beamform processing can be any form of beamform processing including, but not limited to: delay and sum beamform processing; delay and difference beamform processing; and adaptive beamform processing. In the illustrated embodiment, the beamform processing performed at each beamforming stage forms complimentary (opposing) cardioids for each microphone pair, resulting in virtual microphones 308a-n having spatial sensitivity as shown in gradient fields 310a-n of FIG. 3B. In other embodiments gradient fields may take the shape of other gradient patterns, such as a limacon, based on a beamform processing applied at beamforming stage 406a-n. An output of the virtual microphone channels created at beamforming stages 406a-n is then provided to noise suppression stages 408a-n where noise suppression is applied. An output of each noise suppression stages 408a-n is provided to an independent trigger detector 410a-n of each audio input channel 402a-n. Each trigger detector 410a-n calculates a confidence score. The confidence score is a likelihood that the audio being received in its channel is a correct trigger phrase that matches at least one of predefined voice trigger phrases 212a-n. In order for an audio input channel 402a-n to be determined to detect an audio trigger phrase 204, the confidence score has to exceed a confidence score threshold. The channel with the highest confidence score above the confidence score threshold is selected as the audio source channel of which audio trigger phrase 204 is originating from. A trigger detected by trigger detector 410a-n triggers a voice recognition session of VAU 119 using a corresponding virtual microphone 308a-n as the audio source. In another embodiment, a trigger detected by at least one of trigger detectors 410a-n is passed to verification module 412, as described in greater detail below.

In response to identifying a particular virtual microphone (e.g., virtual microphone 308a) has been determined to contain the audio trigger phrase 204 (and thus virtual microphone 308a is directed in the location of the user), the other channels can be used as noise references. CPU 104 can then perform noise reduction on the audio source using the audio captured by at least one of the other virtual microphones (e.g., virtual microphones 308b-n) as a noise reference. For example, signal to noise ratio of the audio captured by the audio source (virtual microphone 308a) is improved by performing the noise reduction using the audio captured by at least one of the other virtual microphones. For example, channels associated with virtual microphones pointing the opposite direction can be use as noise reference channels. A signal captured by those opposite channels can be provided to a multi-channel noise suppressor module (not illustrated) to improve the signal to noise ratio of a signal being used for a voice recognition session. The resulting (improved) signal is then provided to VAU 119. In another embodiment, the noise reference channel is a channel that is associated with a virtual dipole microphone formed by another microphone pair that is orthogonal to the axis of the audio source virtual microphone.

In one or more embodiments, CPU 104 captures audio content via a plurality of microphone pairs (e.g., microphone pairs 208a-n). Each microphone pair of the plurality of microphone pairs is associated with one audio input channel from among a plurality of audio input channels (e.g., audio input channels 402a-n of FIG. 4) of audio capturing device 100. CPU 104 simultaneously monitors audio content independently on each of the plurality of audio input channels. CPU 104 further detects an audio trigger phrase (e.g., audio trigger phrase 202) on at least one audio input channel. In response to detecting the audio trigger phrase, CPU 104 commences a voice recognition session using the at least one audio input channel as an audio source. In one embodiment, at least one voice recognition algorithm is stored within memory of audio capturing device 100. In another embodiment, at least one voice recognition algorithm resides at another device that is communicatively coupled to audio capturing device 100, such as a connected network device or a cloud network service.

In detecting the audio trigger phrase, CPU 104 determines whether the audio trigger phrase has been detected on at least two audio input channels of the plurality of audio input channels. In response to determining that the audio trigger phrase has been detected on at least two audio input channels, CPU 104 calculates, for each of the at least two audio input channels, a confidence score that identifies a likelihood that the audio trigger phrase matches at least one predetermined audio trigger phrase. In one embodiment, in calculating the confidence score, CPU 104 compares the detected audio trigger phrase to predefined voice trigger phrases 212a-n to determine how closely the detected audio trigger phrase matches one or more of the predefined voice trigger phrases. Detected audio trigger phrases that more closely match a predefined voice trigger phrase may be assigned a high confidence score (e.g., 90% confidence score) while audio trigger phrases that do not closely match a predefined voice trigger phrase may be assigned a lower confidence score (e.g., 30% confidence score). CPU 104 further compares the confidence score of each of the at least two audio input channels to determine a primary audio input channel, having a highest confidence score, from among the at least two audio input channels. In response to identifying the primary audio input channel, CPU 104 establishes the primary audio input channel as the audio source. In another embodiment, the confidence score of the primary audio channel is compared to a confidence score threshold (e.g., 85%). In response to determining that the confidence score of the primary audio channel meets or exceeds the confidence score threshold, CPU 104 establishes the primary audio input channel as the audio source. In the event that the confidence score of the primary audio channel is below the confidence score threshold, CPU 104 determines that the detected audio trigger phrase does not match at least one predetermined audio trigger phrase and CPU 104 does not initiate a voice recognition session using the detected audio trigger phrase.

In another embodiment, in detecting the audio trigger phrase, CPU 104 independently analyzes audio content 202 at the at least one audio input channel to determine at least one highest audio input channel that has a highest level (e.g., highest volume) of speech. In response to identifying the audio input channel that has a highest level of speech, CPU 104 determines whether the corresponding highest level of speech is above a predetermined speech volume level threshold. In response to determining the level of speech is above a predetermined speech volume level threshold, CPU 104 establishes the at least one highest audio input channel as the relevant audio source. In response to determining that none of the audio input channels have a level of speech that is above a predetermined speech volume level threshold, CPU 104 does not select an input channel as the relevant audio source and does not initiate a voice recognition session.

In one or more embodiments, CPU 104 performs noise reduction on the relevant audio source using at least one other audio input channel of the plurality audio input channels as a noise reference. In another embodiment, the noise reduction may be performed by using a dual-channel noise suppression system in which estimates are obtained from a different signal than the one used as the audio source. In another embodiment, the noise reduction is performed using spatially disjoint signals, while obtaining the noise estimates from the same audio input channel in which the audio trigger phrase is found (the audio source). The spatially disjoint signals are used for a Voice Activity Detector (VAD) determination allowing for spatially distinct voice activity detection. This allows for an improved noise estimate in a directional audio system. In another embodiment, the noise reduction is performed using an adaptive filter configured as a noise reduction and interference cancelling system using two virtual microphones. It should be noted that performing the noise reduction of the audio source using at least one other audio input channel occurs after the noise suppression stage of the audio input channels.

Detecting a Trigger on an Audio Output Channel

In one or more embodiments, CPU 104 may detect audio trigger phrases (e.g., audio trigger phrase 204 of FIG. 2) within audio output content intended for at least one speaker (e.g., speaker 144*a-n*) on at least one output channel of audio capturing device 100. In response to detecting audio trigger phrases on an output channel, CPU 104 may gate trigger detectors of audio input channels (e.g., audio input channels 402*a-n*) for a time period to prevent the trigger detectors on the audio input channels associated with microphones 108*a-n* from triggering on audio trigger phrases within audio content output from speakers 144*a-n*. Thus, trigger phrases being played back by output devices (e.g., speakers 144*a-n*) of audio capturing device 100 cannot falsely trigger a voice recognition session if captured by microphones 108*a-n*.

In one or more embodiments, CPU 104 continually monitors the at least one audio output channel and/or audio output processing pipeline 420 of FIG. 4 for at least one audio trigger phrase utilized to initiate a voice recognition session. For example, CPU 104 may directly monitor an output audio stream (e.g., output audio stream 422). In response to detecting the at least one audio trigger phrase on the at least one audio output channel, CPU 104 sets a logic state of at least one output trigger detector (e.g., output trigger detector 424 of FIG. 4) of the at least one audio output channel to a first logic state (e.g., a logic high). The first logic state of a trigger detector indicates that at least one audio trigger phrase has been detected. In response to determining the logic state of the at least one output trigger detector is the first logic state, CPU 104 gates a logic state of at least one input trigger detector (e.g., trigger detectors 410*a-n* of FIG. 4) of at least one audio input channel (e.g., audio input channels 402*a-n*) to the first logic state for a time period. In one or more embodiments, the time period is a pre-established amount of time, such as 120 milliseconds. In other embodiments, the time period is a different amount of time. In response to gating the input trigger detectors, CPU 104 prevents initiation of a voice recognition session by the at least one audio trigger phrase on the at least one audio input channel while the logic state of the at least one output trigger detector is the first logic state. Thus, any audio trigger phrases output on speakers 144*a-n* and which are captured by microphones 108*a-n* are ignored and do not trigger a voice recognition session. In one or more embodiments, in response to detecting at least one audio trigger phrase on the at least one audio input channel at a time outside of the time period, CPU 104 commences a voice recognition session on the at least one audio input channel.

In one embodiment, verification module 412 is also connected to an output trigger detector (e.g., output trigger detector 424) that monitors an output audio stream (e.g., output audio stream 422 for an audio trigger phrase (audio trigger phrase 204) that matches at least one predefined voice trigger phrases 212*a-n*. Verification module 412 determines whether a detected audio trigger phrase has been detected on output audio stream 422 within a predetermined time period before a trigger was detected by at least one of trigger detectors 410*a-n*. If a trigger phrase has not been detected on output audio stream 422 within the predetermined time period before a trigger phrase was detected by at least one of trigger detectors 410*a-n*, verification module 412 passes the trigger phrase from audio input channel 402*a-n* along with the captured audio data to VAU 119 to initiate a voice recognition session. In response to output trigger detector 424 detecting an audio trigger phrase on the output audio stream within the predetermined time period before a trigger was detected by at least one of trigger detectors 410*a-n*, verification module 412 gates a state of each trigger detector 410*a-n* of the audio input channel 402*a-n* to a first logic state (e.g., a logic high). By gating trigger detectors 410*a-n* to the first logic state, all triggers from trigger detector 410*a-n* of audio input channel 402*a-n* are prevented from triggering a voice recognition session of VAU 119. Thus, output audio emitted from speakers 144*a-n* containing predefined voice trigger phrases 212*a-n* cannot falsely trigger a voice recognition session. It should be noted that output trigger detector 424 may be used to gate real or virtual microphone channels.

In another embodiment, in response to gating or blocking the input trigger detectors, CPU 104 disables a voice recognition functionality of the audio capturing device that is triggered by the at least one audio trigger phrase for the duration of the time period. In response to expiration of the time period, CPU 104 can re-enable the voice recognition functionality of the audio capturing device that is triggered by receipt of the at least one audio trigger phrase on the at least one audio input channel.

In another embodiment, in response to gating the input trigger detectors, CPU 104 disables monitoring of the at least one audio input channel for receipt of the at least one audio trigger phrase for the duration of the time period. In response to expiration of the time period, CPU 104 can re-initiate the monitoring of the at least one audio input channel for receipt of at least one audio trigger phrase.

In one or more embodiments, in response to expiration of the time period, CPU 104 clears the logic state of the input trigger detectors and/or the output trigger detector. In another embodiment, in response to expiration of the time period, CPU 104 sets the logic state of the input trigger detectors and/or the output trigger detector to a second logic state (e.g., a logic low) that is different from the first logic state. In one or more embodiments, the second logic state indicates the absence of an audio trigger phrase on a corresponding channel.

Figure 5:
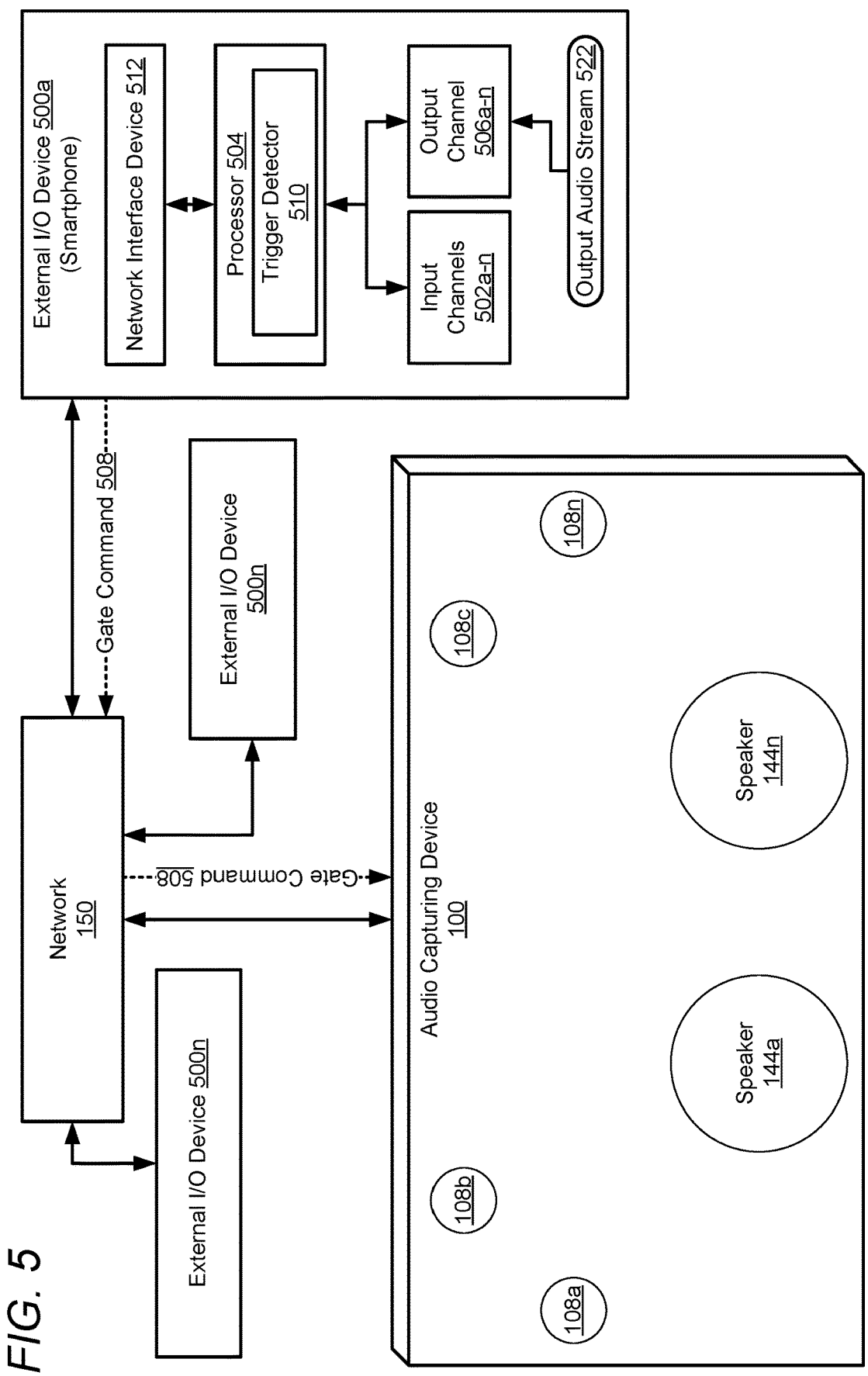
FIG. 5 illustrates an audio recording device that is communicatively coupled to other communication devices via a network, in accordance with one or more embodiments.

Referring now to FIG. 5, there is illustrated an audio recording device that is communicatively coupled to other communication devices via a network, in accordance with one or more embodiments of the disclosure. In one or more embodiments, audio capturing device 100 is communicatively coupled to at least one of external input/output (I/O) devices 500a-n, via a network (e.g., network 150). External I/O devices 500a-n may include, but are not limited to including, wireless speakers, wireless microphones, cellular phones, data processing systems, telecommunication devices, etc. External I/O devices 500a-n include processor 504, at least one network interface device 512, and audio input channels (e.g., input channels 502a-n) and/or audio output channels (e.g., output channels 506a-n) that are monitored by trigger detector 510 executing on processor 504 for audio trigger phrases. In response to an external I/O device (e.g., external I/O device 500a) detecting at least one audio trigger phrase on at least one audio input channel and/or audio output channel, the external I/O device issues to audio capturing device 100, via at least one network connection, gate command 508. Gate command 508 gates the logic state of at least one input trigger detector of audio capturing device 100 to the first logic state. In one or more embodiments, gate command 508 includes an indication of whether the trigger phrase was detected on an input or an output channel. In response to audio capturing device 100 receiving at least one output gate command 508 from the at least one external I/O device 500, CPU 104 gates the logic state of all input trigger detectors of the audio input channels to the first logic state for the duration of the time period. This prevents any trigger phrases on an output channel of the external I/O devices 500a-n from initiating a voice recognition session on audio capture device 100.

In one or more embodiments, in response to receiving the at least one gate command 508 at radios 140a-n, CPU 104 determines an optimal time value for the time period for gating the input trigger detectors based on characteristics of the at least one external I/O device. CPU 104 may determine the characteristics of the at least one external I/O device 500a-n based on a device type (e.g., wireless speaker or cellular phone) and/or a current location of the at least one external I/O device relative to audio capturing device 100. For example, the time period can be modified to a higher value (e.g., 1500 ms) for external I/O devices having a higher audio latency, such as wireless speakers/microphones. In another example, the time period can be modified to a higher value for external I/O devices that are farther away from audio capturing device 100 and can be modified to a lower value for external I/O devices that are closer to audio capturing device 100. By calculating a modified time value for the time period and gating the logic state of the input trigger detectors of the audio input channels to the first logic state for the duration of the time period, any audio trigger phrases matching predefined voice trigger phrases 212a-n that are received at audio capturing device 100 from audio originating at external I/O devices 500a-n will not cause a triggering of input trigger detectors on audio input channels 402a-n.

In another embodiment, a valid input trigger phrase detected by a microphone at external I/O devices 500a-n may be used to begin a voice recognition session on audio capture device 100 using the input channel of that external I/O device as the audio source. Audio content of an external I/O device can be transmitted to audio capture device 100 over the network connection between external I/O devices 500a-n and audio capture device 100 for the voice recognition session.

It should be noted that in one or more embodiments, input trigger detectors 410a-n, output trigger detector 510, and output trigger detector 424 trigger independently. It should also be noted that in other embodiments, audio capturing device 100 can include only a single microphone. In this embodiment, output trigger detector 424 gates a state of a single trigger detector associated with the single microphone.

Figure 6:
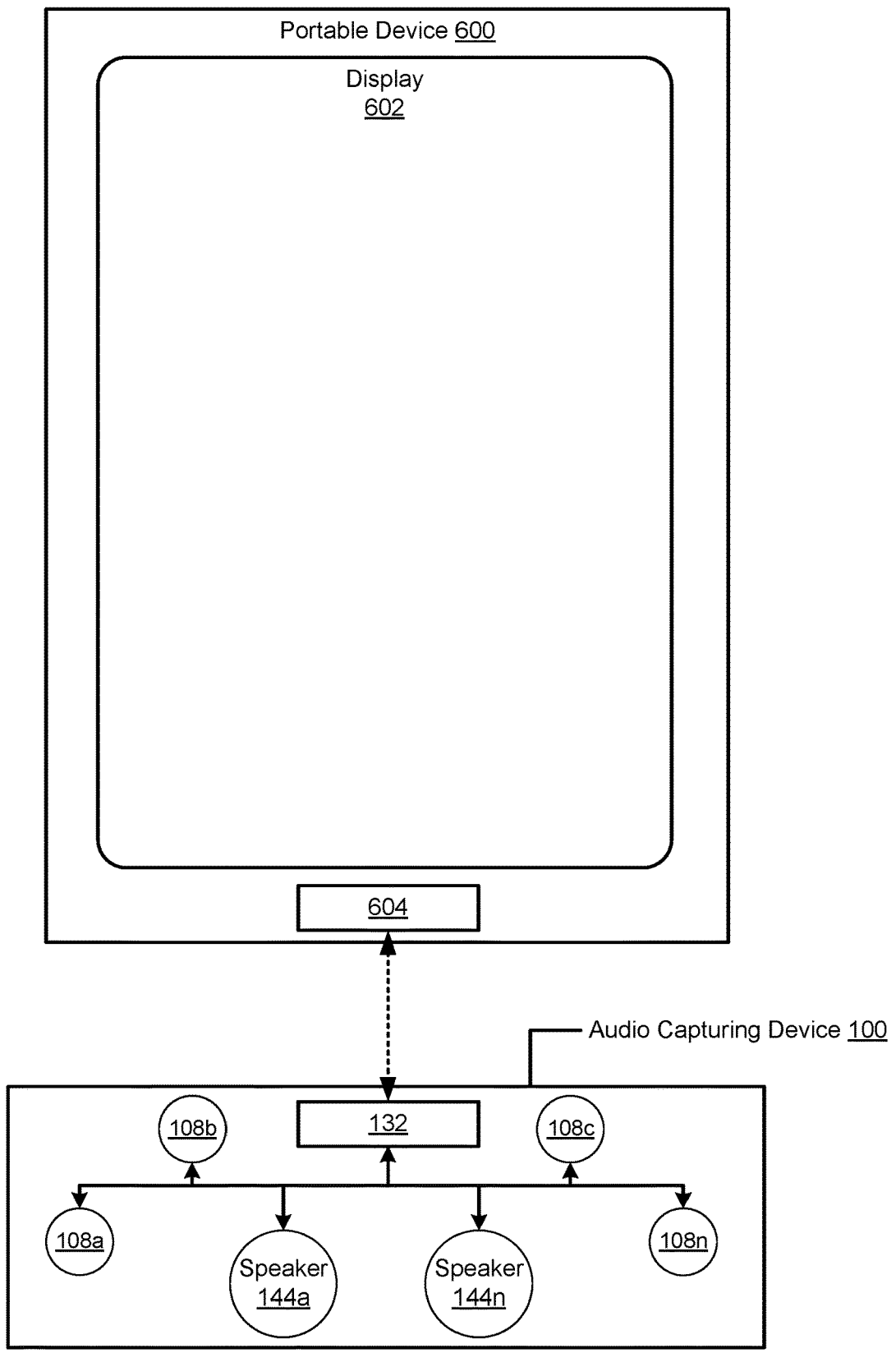
FIG. 6 illustrates a portable device that may be attached to the audio capturing device, in accordance with one or more embodiments.

Referring now to FIG. 6, there is illustrated a portable device that may be coupled to an audio recording device, in accordance with one or more embodiments of the disclosure. In one or more embodiments, portable device 600 may be a cellular phone or a tablet computer. Portable device 600 may be a similar device to audio capturing device 100. Portable device 600 includes data port 604 that can operate as a charging port that receives power via an external charging device (not pictured) for charging a battery (not illustrated) of portable device 600 via charging circuitry (not illustrated). Data port 604 can also operate as a charging port that provides power to an external device, such as audio capturing device 100, that is connected to data port 604. Data port 604 may also function as one of an input port, an output port, and a combination input/output port for exchanging data with audio capturing device 100 or another external device (not illustrated). In one or more embodiments, audio capturing device 100 exchanges data with portable device 600 via data port 132 and data port 604. In one or more embodiments, a processor (not illustrated) of portable device 600 can also execute TPU 117 and/or one or more portions thereof, as described herein. In another embodiment, performance of the various functionality (of TPU 117) described herein can be split between at least one processor of portable device 600 and CPU 104 of audio capturing device 100.

Figure 7:
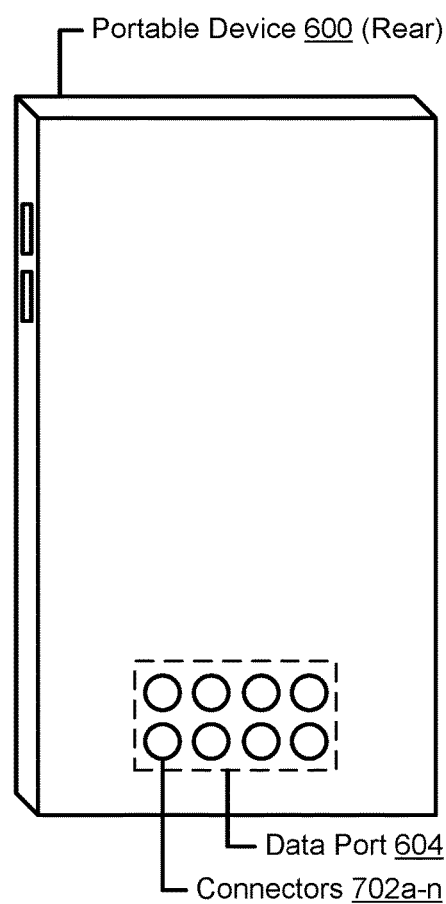
FIG. 7 illustrates a front and rear view of the audio capturing device and a front and rear view of a portable device that may be connected to the audio capturing device, in accordance with one or more embodiments.
Figure 7:
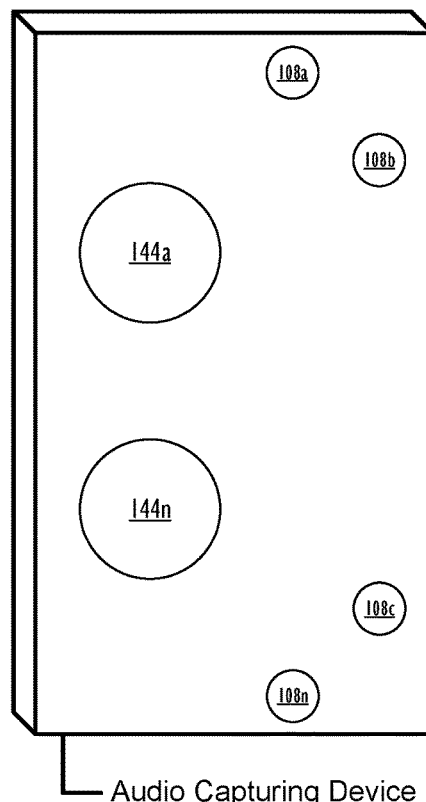
Figure 7:
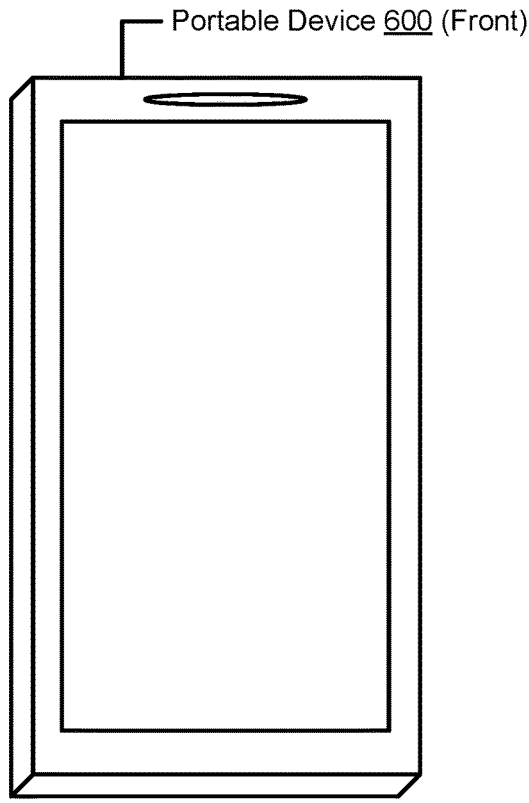
Figure 7:
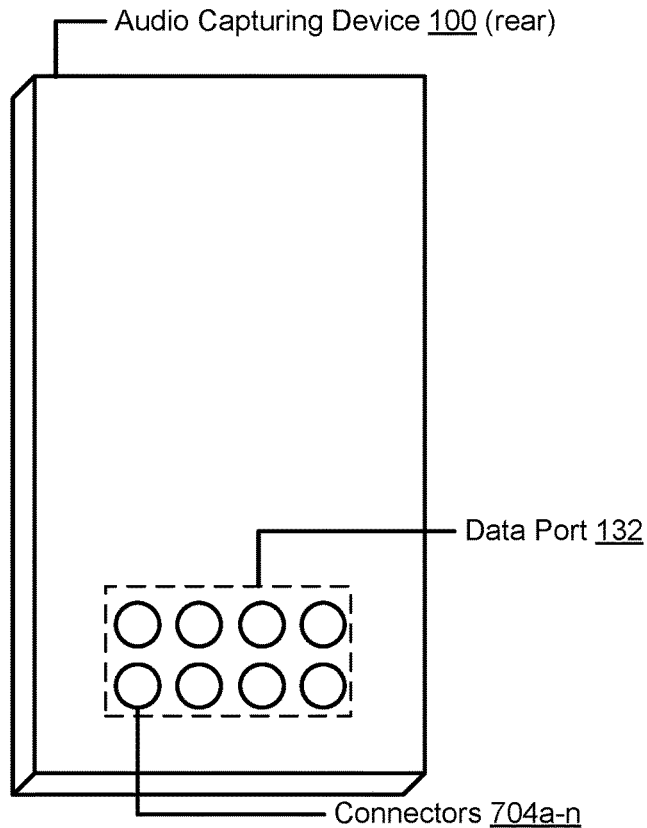

Referring now to FIG. 7, there is illustrated a front and rear view of the audio capturing device and a front and rear view of a portable device that may be connected to the audio capturing device, in accordance with one or more embodiments of the disclosure. As illustrated, a rear face of the portable device 600 comprises data port 604, which includes connectors 702a-n. Connectors 702a-n provide a physical interface that facilitates the exchange of data and/or a flow of power between portable device 600 and another device (such as audio capturing device 100). Also illustrated is a rear face of audio capturing device 100, which comprises data port 132 having connectors 704a-n. Connectors 704a-n provide a physical interface that facilitates the exchange of data and/or a flow of power between portable device 600 and another device (such as audio capturing device 100). In one or more embodiments, a rear face of audio capturing device 100 may snap to, or otherwise be attached to, a rear face of portable device 600 to align connectors 704a-n with connectors 702a-n to enable the exchange of data and/or the flow of power between audio capturing device 100 and portable device 600.

Figure 8:
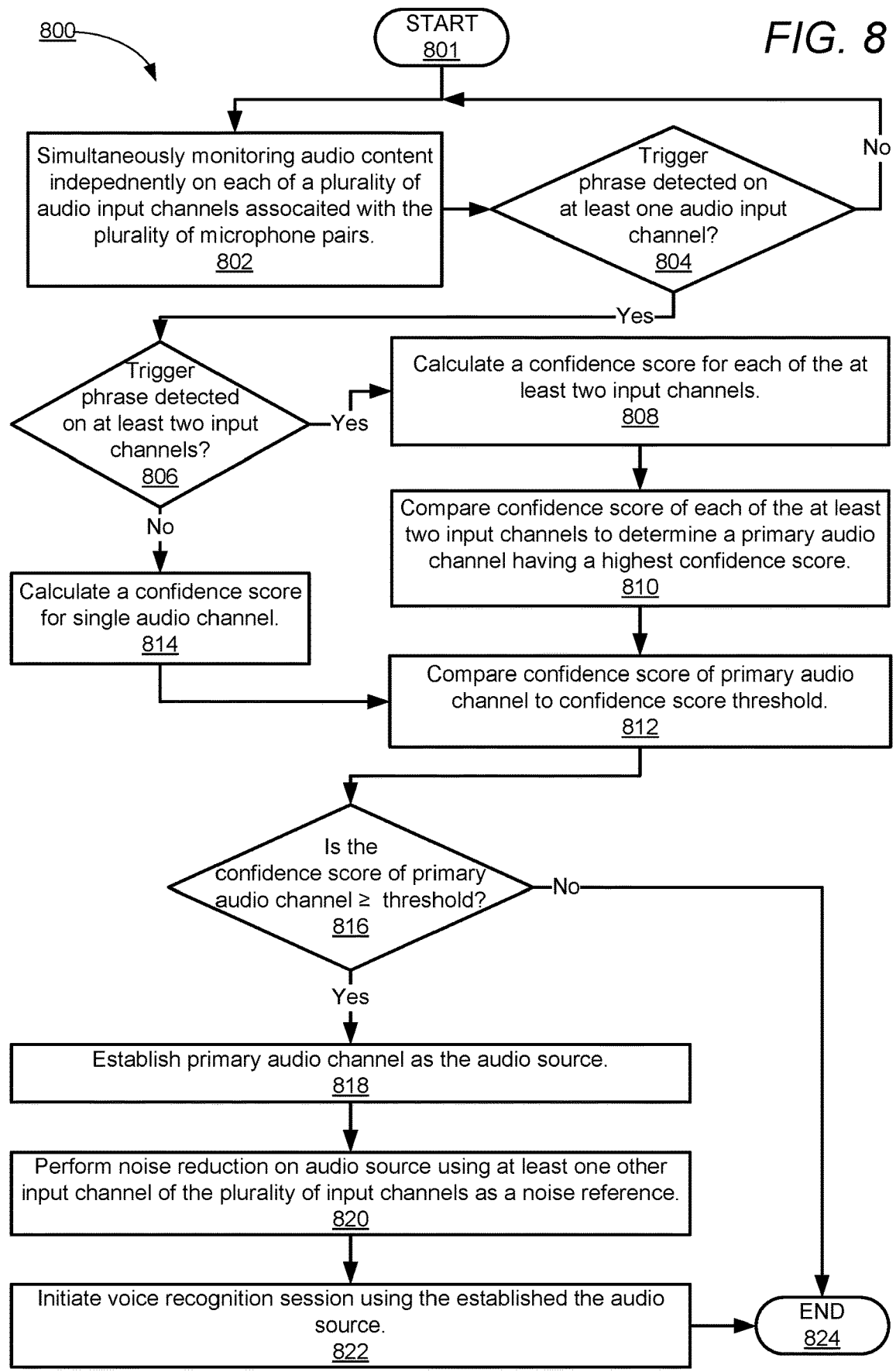
FIG. 8 is a flow chart illustrating a method for detecting audio trigger phrases for a voice recognition session, in accordance with one or more embodiments.

Referring now to FIG. 8. FIG. 8 is a flow chart illustrating a method for detecting audio trigger phrases for a voice recognition session, in accordance with one or more embodiments of the present disclosure. Aspects of the method are described with reference to the components of FIGS. 1-5. Several of the processes of the method provided in FIG. 8 can be implemented by a processor (e.g., CPU 104) executing the software code of TPU 117 within an audio capturing device (e.g., audio capturing device 100). The method processes described in FIG. 8 are generally described as being performed by components of audio capturing device 100.

Method 800 commences at initiator block 801 then proceeds to block 802. At block 802, CPU 104 simultaneously monitors audio content on each of a plurality of audio input channels associated with a plurality of microphone pairs for audio trigger phrases. It should be noted that in one or more embodiments each audio input channel is monitored independently. At block 804, CPU 104 determines whether at least one trigger phrase was detected on at least one audio input channel of the plurality of audio input channels. In response to determining that no trigger phrases were detected, method 800 proceeds back to block 802, and CPU 104 continues monitoring the plurality of audio input channels for audio trigger phrases.

In response to detecting at least one audio trigger phrase on at least one audio input channel, CPU 104 determines whether the at least one audio trigger phrase was detected on at least two audio input channels (block 806). In response to determining at block 806 that the at least one audio trigger phrase was detected on multiple audio input channels, CPU 104 calculates a confidence score that identifies a likelihood that the detected audio trigger phrase matches at least one predetermined audio trigger phrase (block 808). The confidence score is individually calculated for each of the multiple audio input channels on which at least one trigger phrase was detected. At block 810, CPU 104 compares the confidence score of each of the detected audio trigger phrase on each of the multiple audio input channels to determine a primary audio channel having a highest confidence score. Method 800 then proceeds to block 812.

In response to determining at block 806 that the at least one audio trigger phrase was detected on a single audio input channel, method 800 proceeds to block 814 and CPU 104 identifies the single audio input channel as the primary audio channel and calculates a confidence score for the single audio input channel. Method 800 then proceeds to block 812.

At block 812, CPU 104 compares the confidence score of the primary audio channel to a confidence score threshold. At block 816, CPU 104 determines whether the confidence score of the primary audio channel meets or exceeds the confidence score threshold. In response to determining that the confidence score of the primary audio channel is below the confidence score threshold, method 800 ends at block 824. In response to determining that the confidence score of the primary audio channel meets or exceeds the confidence score threshold, CPU 104 establishes the primary audio channel as the audio source (block 818). At block 820, CPU 104 performs noise reduction on the audio source using at least one other input channel of the plurality of input channels as a noise reference. It should be noted that CPU 104 only performs a noise reduction on the audio source using at least one other input channel in embodiments having multiple input channels. In embodiments having a single input channel, block 820 is omitted. At block 822, CPU 104 initiates a voice recognition session using the audio source. Method 800 then ends at block 824.

Figure 9:
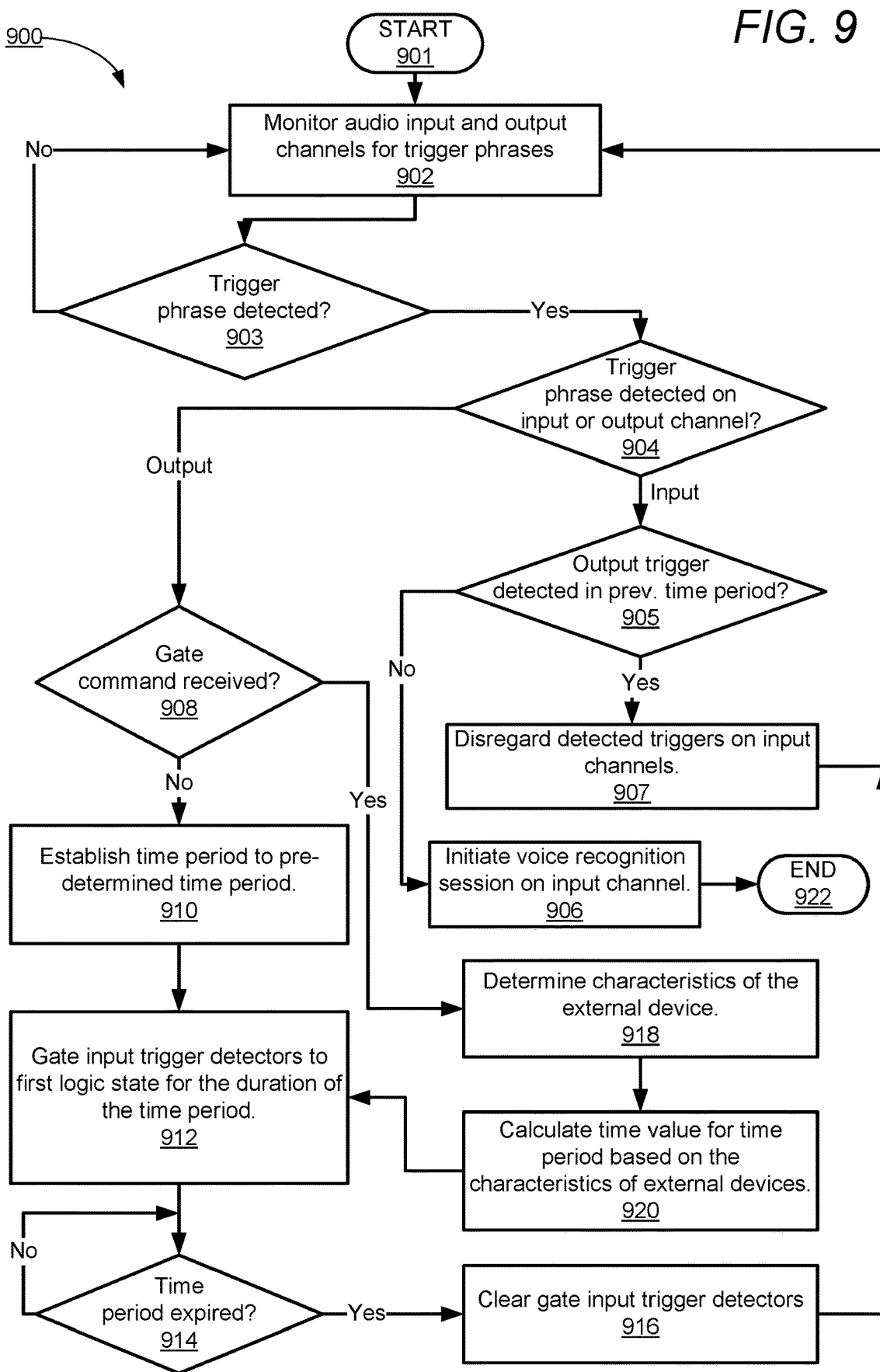
FIG. 9 is a flow chart illustrating a method for preventing initiation of a voice recognition session by at least one audio trigger phrase on at least one audio input channel, in accordance with one or more embodiments.

Referring now to FIG. 9, there is depicted a high-level flow-chart illustrating a method for preventing initiation of a voice recognition session in response to detecting at least one audio trigger phrase on at least one audio output channel, in accordance with one or more embodiments of the present disclosure. Aspects of the method are described with reference to the components of FIGS. 1-5. Several of the processes of the method provided in FIG. 9 can be implemented by a processor (e.g., CPU 104) executing software code of TPU 117 within an audio capturing device (e.g., audio capturing device 100). The method processes described in FIG. 9 are generally described as being performed by components of audio capturing device 100.

Method 900 commences at initiator block 901 then proceeds to block 902. At block 902, CPU 104 concurrently monitors, via trigger detectors (e.g., trigger detectors 410a-n and output trigger detector 424) of audio input processing pipeline 400 and audio output processing pipeline 420, for predefined voice trigger phrases 208a-n. At block 903, CPU 104 determines whether an audio trigger phrase (e.g., audio trigger phrase 204) corresponding to one of predefined voice trigger phrases 208a-n has been detected. In response to determining audio trigger phrase 204 has not been detected, method 900 continues back to block 902, and CPU 104 continues to monitor the input channels and the output audio stream 422 for predefined voice trigger phrases 208a-n. In response to determining audio trigger phrase 204 has been detected, CPU 104 determines whether the audio trigger phrase 204 is detected on an input channel (e.g., input channels 402a-n) or an output audio stream (e.g., output audio stream 422) of audio capturing device 100 (block 904). In response to determining audio trigger phrase 204 is detected on a trigger detector (e.g., trigger detectors 410a-n) on an input channel, verification module 412 determines whether audio trigger phrase 204 was detected by the output trigger detector in a predetermined time period before audio trigger phrase 204 was detected by at least one trigger detector on at least one input channel (block 905). In response to determining audio trigger phrase 204 has not been detected by the output trigger detector in the predetermined time period, CPU 104 initiates a voice recognition session on the input channel where audio trigger phrase 204 was detected (block 906). Method 900 then ends at block 922. In response to determining audio trigger phrase 204 has been detected by the output trigger detector in the predetermined time period, verification module 412 disregards the detected audio trigger phrase on the input channel and/or gates a state of trigger detectors of audio capturing device 100 (block 907). Method 900 then continues back to block 902.

In response to detecting, at block 904, audio trigger phrase 204 on output audio stream 422, CPU 104 determines whether audio capturing device 100 has received a gate command from at least one external device that indicates that audio trigger phrase 204 was detected at an audio input/output channel of at least one external device (block 908). If a gate command was not received, CPU 104 determines the time period for gating the input trigger detectors of audio capturing device 100 (block 910). In one embodiment, the time period is a pre-established amount of time, such as 120 ms. In response to determining the time period, CPU 104 gates the input trigger detectors of audio capturing device 100 to a first logic state for the duration of the time period (block 912). The gating of the input trigger detectors prevents initiation of a voice recognition session on the at least one input channel in response to detecting a trigger phrase during the time period. At block 914, CPU 104 determines whether the time period has expired. In response to determining the time period has expired, CPU 104 clears the gating of the input trigger detectors (block 916). Method 900 then continues back to block 902.

In response to determining at block 908 that a gate command was received, CPU 104 determines characteristics of the external device. For example, CPU 104 can determine a location of the external device and/or a type of the external device, such as that the external device is a Bluetooth device. In response to determining the characteristics of the external device, CPU 104 calculates the time period for disabling trigger detection for a voice recognition session on at least one input channel of audio capturing device 100 based on the characteristics of the external device (block 920). In one or more embodiments, a time period calculated for gating input trigger detectors based on an audio trigger phrase detected on an external device is different from a time period for gating input trigger detectors based on an internal audio stream. For example, the time period for gating input trigger detectors based on an audio trigger phrase detected on an external device may be 1500 ms. In another embodiment, CPU 104 may extend a default time period for gating input trigger detectors by a calculated amount of time based on the characteristics of the external device. For example, a default time period for gating input trigger detectors for an audio trigger phrase detected on an external device may be 1250 ms. The default time period may be extended by 250 ms for Bluetooth® devices (for a total time period of 1500 ms). In response to calculating the time period, method 900 continues to block 912.

In the above-described flow charts of FIG. 8-9, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
capturing audio content by a plurality of microphone pairs of an audio capturing device, wherein each microphone pair of the plurality of microphone pairs is associated with a separate audio input channel of a plurality of audio input channels of the audio capturing device, and each microphone pair is processed to form virtual first order directional microphones;
simultaneously monitoring, by a processor of the audio capturing device, audio content on each of the plurality of audio input channels;
detecting, by the processor, an audio trigger phrase on at least one audio input channel of the plurality of audio input channels; and
in response to detecting the audio trigger phrase on the at least one audio input channel:
calculating a confidence score for the audio trigger phrase and evaluating whether the confidence score exceeds a confidence score threshold;
selecting, as a primary audio input channel, an audio source channel with a highest confidence score of the detected audio trigger phrase that is above the confidence score threshold for the audio trigger phrase;
triggering a voice recognition session of a virtual assistant utility using a corresponding virtual microphone of the selected primary audio source channel as the audio source; and
commencing the voice recognition session using the primary audio input channel from among the at least one audio input channel as an audio source from which to receive the audio content to perform the voice recognition session.

2. The method of claim 1, wherein detecting the audio trigger phrase further comprises:
determining whether the audio trigger phrase has been detected on at least two audio input channels of the plurality of audio input channels; and
in response to determining that the audio trigger phrase has been detected on at least two audio input channels:
calculating, for each of the at least two audio input channels, a confidence score that identifies a likelihood that the audio trigger phrase matches at least one predetermined audio trigger phrase;
comparing the confidence score of each of the at least two audio input channels to determine the primary audio input channel as the audio input channel having a highest confidence score; and
in response to determining the primary audio input channel, establishing the primary audio input channel as the audio source.

3. The method of claim 1, further comprising:
performing noise reduction on the audio source using at least one other audio input channel of the plurality of audio input channels as a noise reference.

4. The method of claim 1, wherein detecting the audio trigger phrase further comprises:
independently analyzing the audio content at the at least one audio input channel to determine at least one highest audio input channel that has a highest level of speech that is above a predetermined speech threshold; and
establishing the at least one highest audio input channel as the audio source.

5. The method of claim 1, wherein:
a first axis passing through a center of the first microphone and a center of the second microphone of a first microphone pair and a second axis passing through a center of the first microphone and a center of the second microphone of a second microphone pair meet at an orthogonal intercept outside of the audio capture device;
the axes of each microphone pair of the plurality of microphone pairs points away from at least one speaker of the audio capturing device; and
at least one speaker that is located within a null direction of the plurality of virtual microphones.

6. The method of claim 1, further comprising:
collectively processing, for each microphone pair of the plurality of microphone pairs, audio content captured by the first microphone and the second microphone to create a plurality of virtual microphones comprising:
a first virtual microphone that is aligned along an axis and which provides spatial sensitivity for audio originating within a first gradient field in a first direction; and
a second virtual microphone that is aligned along the axis and which provides spatial sensitivity for audio originating within a second gradient field in a second direction that is opposite the first direction.

7. The method of claim 1, wherein:
a spacing between the first and the second microphone in the microphone pair enables a directional location of a sound source within an audio field captured by a formed virtual microphone to be achieved; and
the plurality of virtual microphones created from the microphone pair comprises a first virtual microphone that captures audio in a first direction and a second virtual microphone that captures audio in a second direction that is opposite the first direction.

8. The method of claim 1, wherein, the first microphone and a second microphone of each microphone pair are separated by a distance corresponding to a half wave length or less of a captured signal, wherein each microphone pair is spaced sufficiently far apart to prevent a rotation of a beamform in a plane containing all of the plurality of microphones.

9. The method of claim 1, further comprising collectively processing, via a beamforming stage, audio content captured by the first microphone and the second microphone of each microphone pair to create a plurality of virtual microphones, wherein virtual microphones generated from each microphone pair comprise (i) a first virtual microphone that is aligned along an axis and which provides spatial sensitivity for audio originating within a first gradient field in a first direction and (ii) a second virtual microphone that is aligned along a same axis and which provides spatial sensitivity for audio originating within a second gradient field in a second direction that is opposite the first direction.

10. The method of claim 1, wherein calculating the confidence score comprises:
comparing a detected audio trigger phrase to predefined voice trigger phrases to determine how closely the detected audio trigger phrase matches one or more of the predefined voice trigger phrases;
assigning the confidence score based on a closeness of the match;
comparing the confidence score to the confidence score threshold;
in response to the confidence score of the primary audio channel being below the confidence score threshold, determining that the detected audio trigger phrase does not match at least one predetermined audio trigger phrase; and in response to determining that the confidence score of the primary audio channel meets or exceeds the confidence score threshold, establishing the primary audio source channel as the audio source;

wherein the processor does not initiate a voice recognition session using the detected audio trigger phrase unless the confidence score of the primary audio channel meets or exceed the confidence score threshold.

11. The method of claim 1, wherein each audio input channel comprises a beamforming stage that collectively processes audio content captured by a first microphone and a second microphone of each microphone pair to create, with each microphone pair, the plurality of virtual microphones having spatial sensitivity.

12. An audio capturing device comprising:
at least one speaker;
a plurality of microphone pairs that capture audio content to a plurality of audio input channels;
a plurality of audio input channels, each audio input channel coupled to and receiving the audio content from a single microphone pair that is processed to form virtual first order directional microphones;
at least one processor coupled to the plurality of audio input channels and which:
simultaneously monitors the audio content on each of the plurality of audio input channels;
independently detects an audio trigger phrase on at least one audio input channel of the plurality of audio input channels; and
in response to detecting the audio trigger phrase on the at least one audio input channel:
calculates a confidence score for the audio trigger phrase and evaluating whether the confidence score exceeds a confidence score threshold;
selects, as a primary audio input channel, an audio source channel with a highest confidence score of the detected audio trigger phrase that is above the confidence score threshold for the audio trigger phrase;
triggers a voice recognition session of a virtual assistant utility using a corresponding virtual microphone of the selected primary audio source channel as the audio source; and
commences the voice recognition session using the primary audio input channel from among the at least one audio input channel as an audio source from which to receive the audio content to perform the voice recognition session.

13. The audio capturing device of claim 12, wherein in detecting the audio trigger phrase the at least one processor:
determines whether the audio trigger phrase has been detected on at least two audio input channels of the plurality of audio input channels; and
in response to determining that the audio trigger phrase has been detected on at least two audio input channels:
calculates, for each of the at least two audio input channels, a confidence score that identifies a likelihood that the audio trigger phrase matches at least one predetermined audio trigger phrase;
compares the confidence score of each of the at least two audio input channels to determine the single primary audio input channel as the audio input channel having a highest confidence score; and in response to determining the primary audio input channel, establishes the primary audio input channel as the audio source.

14. The audio capturing device of claim 12, wherein in detecting the audio trigger phrase the at least one processor:
independently analyzes the audio content at the at least one audio input channel to determine at least one highest audio input channel that has a highest level of speech that is above a predetermined speech threshold; and
establishes the at least one highest audio input channel as the audio source.

15. The audio capturing device of claim 12, wherein:
a first axis passing through a center of the first microphone and a center of the second microphone of a first microphone pair and a second axis passing through a center of the first microphone and a center of the second microphone of a second microphone pair meet at an orthogonal intercept outside of the audio capture device;
the axes of each microphone pair of the plurality of microphone pairs points away from the at least one speaker; and,
the at least one speaker that is located within a null direction of the plurality of virtual microphones.

16. The audio capturing device of claim 12, wherein the at least one processor:
collectively processes, for each microphone pair of the plurality of microphone pairs, audio content captured by the first microphone and the second microphone to create a plurality of virtual microphones comprising:
a first virtual microphone that is aligned along an axis and which provides spatial sensitivity for audio originating within a first gradient field in a first direction; and
a second virtual microphone that is aligned along the second axis and which provides spatial sensitivity for audio originating within a second gradient field in a second direction that is opposite the first direction.

17. The audio capturing device of claim 12, wherein each audio input channel comprises a beamforming stage that collectively processes audio content captured by a first microphone and a second microphone of the single microphone pair to create, with each microphone pair, a plurality of virtual microphones having spatial sensitivity.

18. A computer program product comprising:
a computer readable storage device; and
program code on the computer readable storage device that, when executed by a processor associated with an audio capturing device, enables the audio capturing device to provide the functionality of:
capturing audio content by a plurality of microphone pairs of an audio capturing device, wherein: each microphone pair of the plurality of microphone pairs is associated with a separate audio input channel of a plurality of audio input channels of the audio capturing device; each microphone pair is processed to form virtual first order directional microphones; and each audio input channel comprising a beamforming stage that collectively processes audio content captured by a first microphone and a second microphone of each microphone pair to create, with each microphone pair, a plurality of virtual microphones having spatial sensitivity;
simultaneously monitoring, by a processor of the audio capturing device, audio content independently on each of the plurality of audio input channels;

detecting, by the processor, an audio trigger phrase on at least one audio input channel of the plurality of audio input channels; and in response to detecting the audio trigger phrase on the at least one audio input channel:
- calculating a confidence score for the audio trigger phrase and evaluating whether the confidence score exceeds a confidence score threshold;
- selecting, as a primary audio input channel, an audio source channel with a highest confidence score of the detected audio trigger phrase that is above the confidence score threshold for the audio trigger phrase;
- triggering a voice recognition session of a virtual assistant utility using a corresponding virtual microphone of the selected primary audio source channel as the audio source; and
- commencing the voice recognition session using the primary audio input channel from among the at least one audio input channel as an audio source from which to receive the audio content to perform the voice recognition session.

19. The computer program product of claim 18, the program code for detecting the audio trigger phrase further comprising code for:
- determining whether the audio trigger phrase has been detected on at least two audio input channels of the plurality of audio input channels; and
- in response to determining that the audio trigger phrase has been detected on at least two audio input channels:
  - calculating, for each of the at least two audio input channels, a confidence score that identifies a likelihood that the audio trigger phrase matches at least one predetermined audio trigger phrase;
  - comparing the confidence score of each of the at least two audio input channels to determine the primary audio input channel as the audio input channel having a highest confidence score; and
  - in response to determining the primary audio input channel, establishing the primary audio input channel as the audio source.

* * * * *